June 19, 1945.  J. L. STUART ET AL  2,378,593
REINFORCED CONCRETE PIPE LINE CONSTRUCTION
Filed July 13, 1942
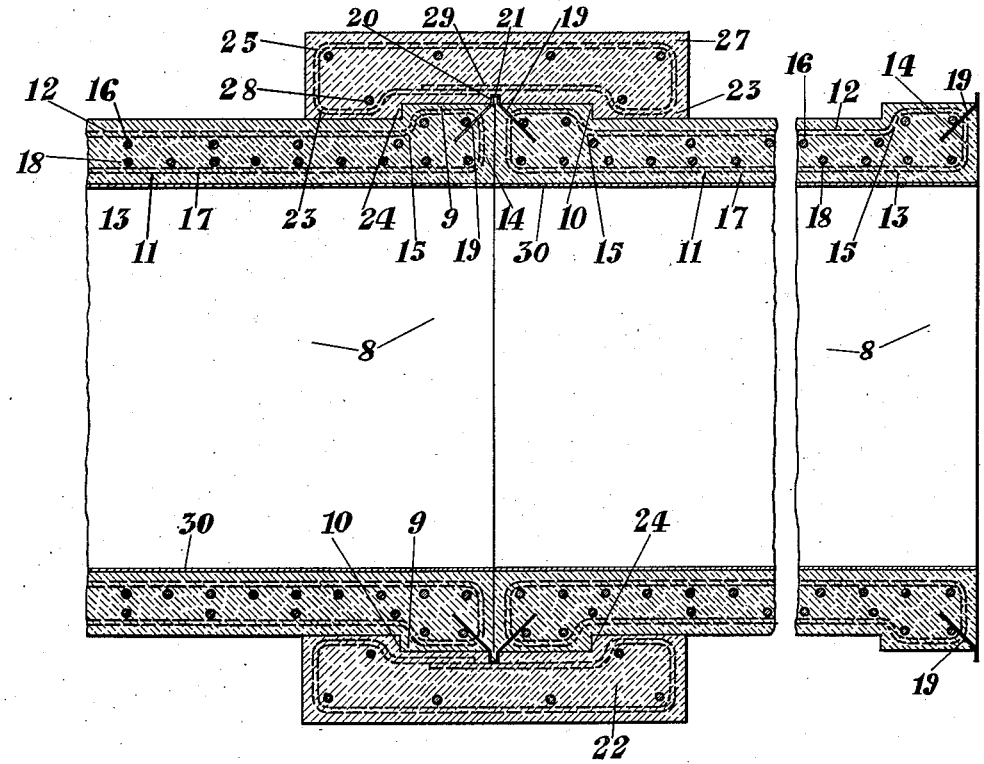
Fig. 1.
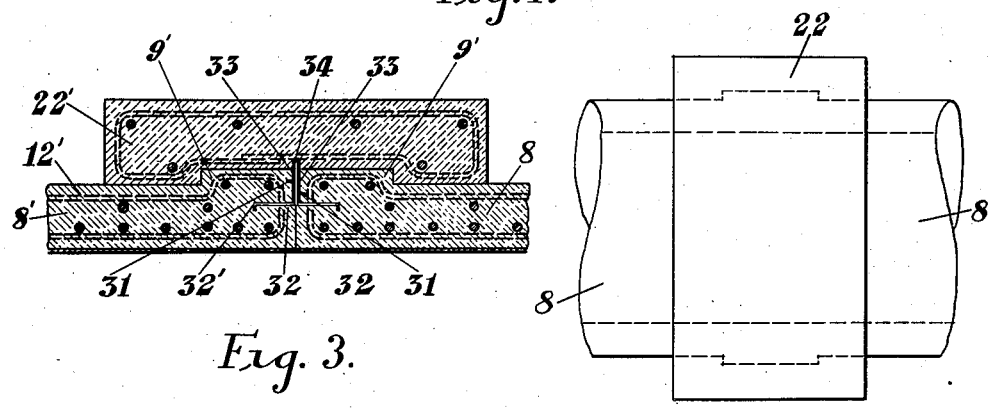
Fig. 3.
Fig. 2.
INVENTORS
JAMES L. STUART
BY OSCAR VON VOIGTLANDER
ATTORNEY Patented June 19, 1945

2,378,593

UNITED STATES PATENT OFFICE 2,378,593

REINFORCED CONCRETE PIPE LINE CONSTRUCTION

James L. Stuart, Sewickley, and Oscar Von Voigtlander, Mount Lebanon, Pa.

Application July 13, 1942, Serial No. 450,790

6 Claims. (Cl. 138—85)

This invention relates to a pipe line adapted to convey fluids, especially petroleum, and more particularly one constructed primarily of concrete pipes suitably reinforced to withstand the pressure necessary to supply the velocity force for travel of the petroleum through the line, with the pipes of the line joined effectively against leakage and injury through such great pressure and with the pipes internally lined to enable the petroleum to travel with minimum friction and overcome deleterious attack by acids or other materials in the petroleum.

One prime object is to provide a means to supplant metal piping for the transportation of oil and other fluids, not only to reduce the cost of manufacture and installation, but to enable the use of such materials therein, as far as practical, as are not subject to priorities, and at the same time attaining the result of being able to manufacture a practical pipe line of reinforced concrete construction for transportation of fluids under pressure, which is of the most efficient size and capacity.

We produce such a construction as will be particularly effective when embedded in the ground below the frost line so that it will be subject to a temperature, namely that of the surrounding earth, which is approximately even whereby the reinforced pipe line will be subject to minimum contraction and expansion.

It is further aimed to provide a joint for the pipes having metal-united parts on the adjacent ends of pipes forming a fluid tight seal and flanges or enlargements on the pipes providing shoulders coacting with shoulders on a reinforced concrete collar cast around the flanges and itself with flanges longitudinally outwardly with respect to those of the pipe and having shoulders in abutment therewith, all so proportioned, constructed and arranged as to protect the said seal by obviating any tendency towards slippage of the pipes and collars, danger of shearing at the joint especially at the flanges and to overcome generally the effect of great internal pressure.

One more important object is to produce such a pipe line as will withstand, against danger of fracture or leakage, internal pressures far greater than any known construction of concrete pipe line and for instance pressures of 250 lbs. per square inch and greater, and a structure wherein the pipes proper will fail before the joints will give or break.

Various additional objects and advantages will become apparent from a consideration of the description following taken in connection with accompanying drawing illustrating operative embodiments by way of example, and wherein—

Fig. 1 is a view in central longitudinal sections through a pipe line constructed in accordance with our invention, the same being broken away and particularly illustrating the joint between adjacent or abutting pipe ends;

Fig. 2 is a view in elevation of the parts of Fig. 1; and

Fig. 3 is a fragmental view similar to Fig. 1 taken on the same plane through a second or modified form of the invention.

Referring specifically to the drawing wherein like reference characters designate like or similar parts and first to the form of the invention disclosed in Figs. 1 and 2, the pipe line is made up to any desired length of a number of pipes 8 which are preformed of concrete or which may be formed of concrete in situ as preferred. The lengths of pipes 8 are formed so that their adjacent ends will abut as shown and so that they have continuous outwardly extending flanges or enlargements 9 which provide abutments or shoulders 10 inwardly of the ends of the pipes.

Pipes 8, as illustrated, have embedded in the concrete thereof, a generally tubular cage-like metallic reinforcing body 11. This body 11 is preferably made up of an outer cylinder 12 and an inner cylinder 13, the latter extending radially outwardly at 14 and then longitudinally within the flanges 9 to meet at the ends and be welded at 15 to the outer cylinder. Said reinforcing body may be of any appropriate construction as for instance, the cylinder 12 is shown as an open wire mesh fabric having longitudinal reinforcing wires or rods 16 about and welded to its interior surface. This cylinder 12 primarily reinforces the pipe against temperature stresses, but the cylinder 13 must reinforce the pipe at the interior particularly to overcome the great internal pressures to which petroleum is subjected. To this end, cylinder 13 is much stronger and will withstand much greater pressures both internally and externally than cylinder 12 and it is preferably made up of helically or otherwise wound or prefabricated bars 18 to one surface of which longitudinal bars or rods 17 are applied and welded. In lieu of the helical bars 18, we may substitute a series of parallel rods and weld them against either the inner or outer surface of rods 17. It will be clear that cylinder 13, like cylinder 12, is an open mesh body, to the end that the concrete of the pipe may fill the cage-like reinforcement, and be effectively compacted to have maximum density throughout.

At the end of each pipe 8, a sealing ring 19, usually inclined, is anchored by embedding the inner portion in the concrete. These rings are preferably metallic and for instance of soft copper and have external annular terminal portions 20 disposed approximately flush with the planes of the ends of the pipes. Such portions 20 of adjacent pipe ends contact, are pressed together intimately and are metal-united as by welding or soldering at 21. As a result, a joint is formed which is proof against leakage of petroleum or other conveyed fluid.

A novel and effective means are provided to prevent undue or injurious expansion, slippage or separation of the pipes at their joints, such as would injure or rupture the weld 21. To this end, we cast around the ends of adjacent pipes a collar 22 of concrete, using any preferred form. With said collar 22 thus applied in plastic form of concrete under appropriate air pressure to secure maximum density, said enlargement or flanges 9 not only are contacted but the body extends longitudinally beyond the shoulders 10 to provide inwardly extending flanges 23 of less internal diameter than the external diameter of flanges 9 in order to intimately fit the pipe beyond flanges 9 and provide shoulders 24 which intimately abut the shoulders or abutments at 10. The same kind of Portland or other cement may be used in the concrete from which the pipes 8 and collar 22 are made, but we may use a cement in the concrete of the collar which is more expanding so that the collar in drying will shrink on the pipes.

It is essential that all parts at the joints, and particularly the flanges 9 and 23 be so constructed as to withstand all internal pressure existing within the pipe line and have no tendency to shear and even to be of such strength as to be effective if the pipe proper should fail. To this end, the internal reinforcing body 11 will be of a strength, especially at the cylinder 13, to withstand the predetermined internal pressure for passage of the petroleum through the pipe line. Upon said predetermined pressure, also will depend the longitudinal extent of the flanges 9 and 23, as well as the size, strength and reinforcing material embedded therein.

Concrete collar 22 has embedded therein, a suitable cage-like metallic reinforcing body 25 which it will be noted at 26 has inward bulges located within the flanges 23 and thus of less internal diameter than the external diameter of the flanges 9. The cage reinforcement 25 may consist of an open mesh body formed of loops 27 of metal, secured together in spaced relation by tie bars 28 disposed against and welded to the inner surface thereof. Cage 25 in effect forms a suitably shaped sheet of open mesh material which is overlapped at its terminals as at 29 and which terminals are welded together and even welded to the sealing rings 19 by extending or enlarging the weld 21. The thickness of collars 22 and the strength of the reinforcing cage 25 will be designed in accordance with the pressure which the pipe line must withstand.

On the bore or interior wall of the pipes we provide a coating 30 in order to reduce friction to a minimum and prevent attack of the concrete of the pipes by acids or other materials contained in the petroleum. We may employ as the coating, which can be applied in any suitable manner as by brushing or spraying the same onto the pipe, after dry cleaning thereof with a wire brush or otherwise, sodium silicate, "Sika No. 4" or "Silmac" (both of which contain primarily sodium silicate), or any similar oil and acid protecting liquid.

The pipe line described will withstand greater pressures than heretofore thought feasible and for instance 250 lbs. per square inch and better, without any tendency of the pipes shearing or giving at the joints and hence the pipe line is well adapted for use in the transportation of petroleum. Our pipe line also possesses all of the advantages of a metal pipe line or metal pipes but the metal used by us need not exceed twenty per cent of the amount required for similar capacity metal pipe and often times is a much lower percentage. The instant pipe in use, is primarily buried or embedded in the ground below the frost line and usually this result is attained at six feet below the surface of the ground. This is important since the concrete will be subject only to the approximately constant and non-fluctuating temperature of the surrounding earth or medium so that the hazards incident to contraction or expansion of the concrete will be overcome or kept at a minimum.

Various changes may be resorted to within the spirit and scope of the invention and for instance the form illustrated in Fig. 3. In the latter form, the sealing rings are designated 31 and for instance are of copper and angular in cross section so as to have walls or flanges 32 and 33. Flanges 32 are embedded and anchored in the concrete of the pipes equivalent to those at 8 and here designated 8' and such flanges within the pipe may be welded as at 32' to the reinforcing cage 12', identical with that of the preceding form. Flanges 33 extend radially outwardly beyond the flanges 9', similar to those at 9 and the abutting flanges 33 of the rings of adjacent pipes are marginally welded together at 34, similarly to the weld at 21 and for the same purpose. The outer ends of flanges 33 and the weld 34 project outwardly beyond the pipe and are embedded in collar 22' which is identical with and reinforced in the same manner as collar 22. Otherwise, the parts are identical with those of the first form and attain the same results and advantages.

What is claimed is:

1. In the art of constructing conduit lines for the transportation of fluids under pressure, pipes of reinforced concrete having impervious ring means anchored thereon adjacent their ends, said ring means being joined to form a fluid tight joint, and a reinforced concrete collar surrounding the joint and said pipe ends, said pipes and collar having coacting means contacting in planes passing diametrically of the pipes to prevent a relative sliding movement of the pipes and collar.

2. In the art of constructing conduit lines for the transportation of fluids under pressure, pipes of reinforced concrete having metal rings embedded therein adjacent their ends and partly projecting beyond the pipes, said rings being metal-united to form a fluid tight joint, and a reinforced concrete collar surrounding the said pipe ends and in which the joint of the rings is embedded, said pipes and collar having means contacting in planes passing diametrically of the pipes to prevent relative sliding movements of the pipes and collar, said rings being of angle form having one flange embedded longitudinally of the pipes and the other flange extending approximately radially therefrom between the pipes.

3. In the art of constructing conduit lines for the transportation of fluids under pressure, pipes of reinforced concrete having metal rings embedded therein adjacent their ends and partly projecting beyond the pipes, said rings being metal-united to form a fluid tight joint, and a reinforced concrete collar surrounding the said pipe ends and in which the joint of the rings is embedded, said pipes and collar having coacting means contacting in planes passing diametrically of the pipes to prevent a relative sliding movement of the pipes and collar, those portions of the rings embedded in the pipes being approximately diagonal and anchored to the reinforcement thereof.

4. In the art of constructing conduit lines for the transportation of petroleum under pressure, forming the line of reinforced concrete pipes having outwardly extending flange providing shoulders spaced from the ends of the pipes and having an interior coating providing a lining resistant to attack by petroleum, said pipes having contacting rings joined fluid tight, and forming a concrete collar around the joint and the flanges of adjacent pipes with means providing spaced shoulders abutting and between which the first mentioned shoulders are disposed.

5. In the art of constructing conduit lines for the transportation of fluids under pressure, alined reinforced concrete pipes, said pipes having contacting rings joined fluid tight, said pipes having shoulders at adjacent terminals, and an annular reinforced concrete collar surrounding the joint and pipe shoulders in which the shoulders are embedded, said collar having shoulders contacting and between which the first mentioned shoulders are disposed, said flanges and rings coacting and being constructed and arranged to withstand the pressure of the fluids in transit.

6. In the art of constructing conduit lines for the transportation of fluids under pressure, alined reinforced concrete pipes, said pipes having contacting rings embedded therein adjacent their ends, said rings being joined fluid tight and projecting outwardly from the pipes, said pipes having flanges at adjacent terminals providing outwardly extending shoulders spaced from the end walls of the pipes, and an annular reinforced concrete collar surrounding said flanges in which the joined portions of the rings are embedded, said collar having a channel in its inner surface occupied by said flanges and having flanges of less internal diameter than the external diameter of the first mentioned flanges and in abutment with the shoulders of the latter, said flanges coacting and being constructed and arranged to withstand the pressure of the fluids in transit.

JAMES L. STUART.
OSCAR VON VOIGTLANDER.